3,539,685
ANIMAL FEED SUPPLEMENT AND METHOD OF ELIMINATING WORMS FROM ANIMALS
Auguste Louis de Lisle, deceased, late of Scottsdale, Ariz., by Frances S. de Lisle, executrix, Scottsdale, Ariz., assignor to Phoenix Gems, Inc., Phoenix, Ariz., a corporation of Arizona
No Drawing. Continuation-in-part of application Ser. No. 234,838, Nov. 1, 1962, which is a continuation-in-part of application Ser. No. 773,562, Nov. 12, 1958, and also is a continuation-in-part of application Ser. No. 551,829, Apr. 27, 1966, which is a continuation-in-part of application Ser. No. 323,890, Nov. 15, 1963. This application Oct. 27, 1967, Ser. No. 679,295
Int. Cl. A23k 1/00; A61k 27/00
U.S. Cl. 424—127                                  10 Claims

ABSTRACT OF THE DISCLOSURE

Process of eliminating worms from infected animals by feeding them effective amounts of diatomaceous earth containing at least 70% silica derived from diatoms.

CROSS REFERENCES TO RELATED APPLICATIONS

This is a continuation-in-part of application Ser. No. 234,838, filed Nov. 1, 1962, Pat. No. 3,350,264 for Method of Controlling Insects in Cow Barns and The Like Areas, which in turn, was a continuation-in-part of application Ser. No. 773,562, filed Nov. 12, 1958, now abandoned, and a continuation-in-part of application Ser. No. 551,829, filed Apr. 27, 1966, Pat. No. 3,476,-568, for Storage of Seeds to Produce a Cereal Product Free of Frag Count and Toxic Residue, which, in turn, was a continuation of application Ser. No. 323,890, filed Nov. 15, 1963, now abandoned.

SUMMARY OF THE INVENTION

It is an object of the present invention to generally improve the health of animals such as cattle, horses, pigs, goats, dogs, and the like, and more particularly, to eliminate from the intestines thereof any worms or parasites which might be present.

It is a further object of the invention to increase the rate of weight increase of feeder steers and the milk output of cows.

The aforementioned results have been achieved by adding diatomaceous earth to the daily feed ration of the animal, in an amount which is approximately 1%, by weight, of the dry weight of the total daily ration.

Finely divided diatomaceous earth is thoroughly mixed with the ration, or the diatomaceous earth is made available to the animal on a "free-feed" basis.

DESCRIPTION OF THE PREFERRED EMBODIMENTS

The aforementioned application, Ser. No. 551,829, discloses the use of a thin coating of diatomaceous earth on grain prior to the storage thereof to kill insects in the grain. It also refers to the milling of the grain to remove the hulls and the diatomaceous earth, and the grinding of the hulls and the diatomaceous earth to provide an animal feed supplement.

Application Ser. No. 234,838 discloses the dusting of barns and like areas with dry diatomaceous earth to repel flies, and the feeding of diatomaceous earth to cattle in order to have a certain percentage of the diatomaceous earth uniformly dispersed in the animals' excreta so that fly larvae will not proliferate therein.

At the time of the filing of the aforementioned applications, it appeared that the feeding of diatomaceous earth to cattle (either by mixing it with the feed or by using the ground hulls and diatomaceous earth as a feed supplement) was beneficial to the general health of the cattle. This fact has now been substantiated, and, in addition, it has been established that such diatomaceous earth, when thoroughly mixed with the feed or made available to the animal on a "free-feed" basis, is equally beneficial to other animals such as horses, pigs, goats and dogs. It also appears that the diatomaceous earth in the intestines of the animal rids the system of worms and parasites which might be present, and prevents the development of worms and parasites therein.

In addition, the feeding of diatomaceous earth to feeder steers increases their rate of weight increase, and when it is added to the feed of milk cows, the amount of milk produced is increased.

As set forth in available literature, the diatomaceous earths are deposits of the shells of unicellular plants . . . the diatoms. Diatoms are microscopic, aquatic, single-celled algae which are found both in the sea and in fresh water lakes and ponds. The individual diatom consists of a living cell enclosed by two half cell walls which are called valves. The diatoms extract silica from their environment and deposit it in the valves. When the diatom dies, it sinks to the bottom of the body of water and the organic matter is decomposed, leaving the hard siliceous shell or valves. Constant leaching over thousands of years has eliminated most of the extraneous material so that the deposits of diatomite, made up of great numbers of these diatom valves, are relatively pure.

The diatomaceous earths which have been used successfully in the feeding of animals, as referred to above, have the following characteristics:

(1) Free moisture content, in percent: approximately 1.5 to 3.0.

(2) Dry density, in pounds per cubic feet: approximately 20.0 to 24.0.

(3) Percent retained on 325 mesh screen: approximately 9.0 to 13.0.

(4) Particle size, in microns: approximately .1 to 40.0.

(5) Percent silica derived from diatoms: approximately 70.0 to 90.0.

(6) Surface area, in square centimeters per gram: approximately 20,000 to 30,000.

With larger animals such as horses and cattle, the finely divided diatomaceous earth is preferably fed to them at the rate of 1% of the dry weight of the total ration, or 5% of the grain ration. This will result in about 5 ounces of diatomaceous earth per day for such large animals.

For smaller animals, the amount will decrease proportionately, such as, for example, a full tablespoon per day for large dogs and a full teaspoon per day for small dogs, puppies, and cats.

Some animals will eat the diatomaceous earth on a "free-feed" basis, i.e. without having it mixed with the regular feed, and this is particularly true with cattle. However, in most instances it is necessary to thoroughly mix it with the regular feed ration.

It has also been determined that it is advisable to feed the diatomaceous earth to such animals on a regular basis for at least 90 to 120 days to obtain maximum results.

One of the principal results from the use of diatomaceous earth as an animal feed supplement is the elimination of worms and internal parasites, and an improvement in the general over-all health of the animal. Other advantages are increased weight in feeder steers and increased milk-fat and milk-solids-not-fat with dairy cows.

In a test involving 1300 feeder pigs kept on concrete at all times and varying in age and weight from weanlings of 8 weeks, to market age hogs at 230 pounds, one half of the pigs were fed a regular ration and the other half had two percent, by weight, of the regular ration replaced with the aforementioned diatomaceous earth.

On the third day following the beginning of the test and for 3 to 4 days therafter, round worms (Ascarids) were observed in all pens of the test pigs. Parasite studies, direct smear and flotation method, showed no internal parasites at any time in the test group.

The control group, even though previously dewormed with Piperozine, had Ascarids (low level) and *M. hirvdinaceous* (low level).

By the tenth day, all test hogs had stopped rooting and destroying the wooden feeders while the control group showed no change and continued to destroy feeders and fences at the same rate. They also continued to root in the holding pens prior to shipment.

In another test, hookworms disappeared after the first day when the aforementioned diatomaceous earth was fed to dogs and puppies at the rate of one full tablespoon per day to large dogs and one full teaspoon per day to small dogs and puppies.

The same type of diatomaceous earth was fed to greyhounds at the rate of one pound of diatomaceous earth mixed in with the rations for sixty dogs of all ages. One litter of pups which had been receiving the ration with the diatomaceous earth mixed in with it for approximately four months, were wormed for a check test and there were no visible signs of worms of any kind. All of the dogs, full grown and pups, showed a marked improvement in health and appearance.

The same type of diatomaceous earth was fed to thoroughbred Nubian milch goats by mixing in one handful of finely divided diatomaceous earth with the daily ration of each goat. Prior to the usage of the diatomaceous earth, the goats were infested with worms and it was unsatisfactory to feed them worm medicine because it made the milk unfit for human consumption. After feeding them diatomaceous earth, there was no more trouble with worms and the diatomaceous earth did not affect the taste of the milk in any manner whatsoever.

The same type of diatomaceous earth was mixed in with the feed of cows and made available to them on a "free-feed" basis. This improved the general health of the cows and removed the necessity of feeding them worm pills.

The use of diatomaceous earth in the feed of horses caused the passage of large round worms and bots.

In one test involving 12 dairy cows, a fifteen week double reversal feeding approach was used, with the first week in each of the three 5-week periods being used as a cross-over and adjustment period. The cows received high quality alfalfa hay and a simple concentrate mixture, with one half of the cows in each group having five percent by weight, of the feed replaced with the aforementioned diatomaceous earth. The cows were milked twice daily.

Composite milk samples of four consecutive milkings were analyzed by the Babcock fat test, the Golding plastics smear test for solids-not-fat, and the Orange G dye binding technique for protein.

Test results showed a milk fat percent increase from 3.97 percent to 4.04 percent and a milk-solids-not-fat increase from 3.76 percent to 3.81 percent in the experimental animals over the control animals.

In another test involving a herd of purebred Jerseys which were fed the aforementioned diatomaceous earth on a "free choice" basis, i.e. without mixing it in with the feed, at the end of 18 months there was a 15 percent average increase in butter fat per cow and a 15 percent increase in milk per cow.

In a test involving the feeding of diatomaceous earth to feeder steers, the average gain of the test animals was 2.84 pounds per day compared with 2.33 pounds for the control animals. After a 3-month period, the average increase in weight of the test animals over the control animals was 62.3 pounds.

In another test, alternate Holstein-Friesian calves, destined to be retained in the herd, were fed four grams of the diatomaceous earth in the morning milk feeding. This amounted to approximately 1% of the dry food intake of the calves. After 8 weeks, the test animals showed an increase in weight of 3 pounds per calf over the control animals. At the end of 16 weeks, the increase in weight of the test animals over the control animals was 5 pounds, and at the end of 17 weeks, the increase was 11 pounds.

What is claimed is:

1. The method of eliminating worms from the intestines of an animal including the step of feeding to an animal infected with intestinal worms, on a daily basis, diatomaceous earth containing at least about seventy percent silica derived from diatoms, in an amount sufficient to cause worms in the intestines of said animal to be passed therefrom.

2. The method of eliminating worms from the intestines of an animal including the step of feeding to an animal infected with intestinal worms, on a daily basis, in an amount which is at least about one percent by weight of its daily food ration, diatomaceous earth containing at least about seventy percent of silica derived from diatoms.

3. The method of eliminating worms from the intestines of a horse infected with intestinal worms, including the step of feeding the horse about five ounces per day of diatomaceous earth containing at least about seventy percent silica derived from diatoms.

4. The method of eliminating worms from the intestines of a cow or steer, including the step of feeding to a cow or steer infected with intestinal worms about five ounces per day of diatomaceous earth containing at least seventy percent silica derived from diatoms.

5. The method of eliminating worms from the intestines of a dog, including the step of feeding to a dog infected with intestinal worms at least about a teaspoonful per day of diatomaceous earth containing at least about seventy percent silica derived from diatoms.

6. The method of eliminating worms from the intestines of a pig, including the step of feeding to a pig infected with intestinal worms, on a daily basis, in an amount which is at least about two percent of its daily food ration, diatomaceous earth containing at least about seventy percent silica derived from diatoms.

7. The method of producing an animal feed supplement from grains which contain a thin coating of diatomaceous earth thereon, including the steps of milling the grain to remove the hulls and the diatomaceous earth, removing the hulls and the diatomaceous earth from the grain, and grinding together said hulls and diatomaceous earth.

8. The method of eliminating worms from the intestines of an animal, including the step of feeding to an animal infected with intestinal worms, a feed supplement consisting of diatomaceous earth which contains at least about seventy percent silica derived from diatoms and grain hulls which have been ground together, in an amount sufficient to cause worms in the intestines of said animal to be passed therefrom.

9. The method of eliminating worms from the intestines of an animal, including the step of feeding to an animal infected with intestinal worms, on a daily basis, a feed supplement consisting of diatomaceous earth which contains at least about seventy percent silica derived from diatoms and grain hulls which have been ground together, in an amount sufficient to cause worms in the intestines of said animal to be passed therefrom.

10. The method of eliminating worms from the intestines of a cow or steer, including the step of feeding to a cow or steer infected with intestinal worms a feed supplement consisting of diatomaceous earth which contains at least about seventy percent silica derived from diatoms and grain hulls which have been ground together, in an amount sufficient to cause worms in the intestines of said cow or steer to be passed therefrom.

References Cited

UNITED STATES PATENTS

| 2,965,488 | 12/1960 | Belasco | 99—2 |
|---|---|---|---|
| 3,244,527 | 4/1966 | Baker | 99—2 |
| 3,350,264 | 10/1967 | De Lisle | 167—14 |

FOREIGN PATENTS 1,019,542   8/1954   Germany.

OTHER REFERENCES

The Condensed Chemical Dictionary, Reinhold Pub. Co., p. 293, 1966.

Morrison, Feeds & Feeding, 22 ed. Morrison Pub. Co. pp. 57–58, 1957.

A. LOUIS MONACELL, Primary Examiner

J. M. HUNTER, Assistant Examiner

U.S. Cl. X.R.

99—2